US012428890B2

(12) United States Patent
Zimmer et al.

(10) Patent No.: US 12,428,890 B2
(45) Date of Patent: Sep. 30, 2025

(54) TRACK FITTING ASSEMBLY FOR SLIDING DOORS, AND TRACK SYSTEM

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 180 days.

(21) Appl. No.: 18/273,573

(22) PCT Filed: Jan. 18, 2022

(86) PCT No.: PCT/DE2022/000002

§ 371 (c)(1),
(2) Date: Oct. 23, 2023

(87) PCT Pub. No.: WO2022/161568

PCT Pub. Date: Aug. 4, 2022

(65) Prior Publication Data

US 2024/0301735 A1 Sep. 12, 2024

(30) Foreign Application Priority Data

Jan. 29, 2021 (DE) ..................... 20 2021 000 337.1

(51) Int. Cl.
*E05D 15/00* (2006.01)
*E05D 15/06* (2006.01)

(52) U.S. Cl.
CPC .... *E05D 15/0652* (2013.01); *E05Y 2201/684* (2013.01); *E05Y 2800/27* (2013.01); *E05Y 2800/676* (2013.01); *E05Y 2800/683* (2024.05)

(58) Field of Classification Search
CPC ............ E05D 15/0652; E05D 15/0643; E05D 15/0621; E05D 15/0686; E05D 15/0647; B60J 5/062; B60J 5/065; B60J 5/08; B61D 19/005; B61D 19/007; B61D 19/02; E05Y 2800/683; E05Y 2201/684; E05Y 2800/27; E05Y 2800/676; E05Y 2900/506;
(Continued)

(56) References Cited

U.S. PATENT DOCUMENTS 3,927,437 A * 12/1975 Ford ...................... A47H 1/144 16/94 R
4,406,435 A * 9/1983 Anderson ............... E06B 9/323 248/261
(Continued)

FOREIGN PATENT DOCUMENTS

DE 202007009341 U1 * 12/2008 ............. E05D 15/08
DE 102014103043 A1 * 9/2015 ............. E05B 65/08
(Continued)

*Primary Examiner* — Chuck Y Mah
(74) *Attorney, Agent, or Firm* — Smartpat PLC

(57) ABSTRACT

A track fitting assembly includes at least two mutually parallel tracks for a sliding door system. It further includes at least one Z-shaped carrier part, which has a fastening leg, a vertical leg and a support leg. The track fitting assembly also includes at least one insert part, at least some regions of which may be encompassed by the carrier part. Both the carrier part and the insert part each have a constant cross-section along their entire length oriented in the longitudinal direction. A track system includes at least one such track fitting assembly and at least one additional carrier part and/or at least one additional insert part. A piece of furniture includes such a track system.

14 Claims, 4 Drawing Sheets

(58) Field of Classification Search
CPC ........... E05Y 2900/51; E05Y 2900/516; E05Y 2900/518; E05Y 2900/50
See application file for complete search history.

(56) References Cited

U.S. PATENT DOCUMENTS

| | | | | |
|---|---|---|---|---|
| 10,743,698 | B1 * | 8/2020 | Chen | A47H 15/04 |
| 2002/0044824 | A1 * | 4/2002 | Haab | F16B 37/045 403/388 |
| 2008/0115329 | A1 * | 5/2008 | Liao | E05D 15/0652 16/96 R |
| 2010/0077668 | A1 * | 4/2010 | Dries | E05D 15/0626 16/101 |
| 2013/0167326 | A1 * | 7/2013 | Rowan | A47H 15/02 16/94 D |
| 2020/0318409 | A1 * | 10/2020 | Tschanz | E06B 7/18 |

FOREIGN PATENT DOCUMENTS

| | | | | |
|---|---|---|---|---|
| DE | 102014109427 | A1 * | 1/2016 | E05D 15/0652 |
| DE | 202020101165 | U1 | 3/2020 | |
| EP | 2547853 | A1 | 9/2011 | |
| EP | 3114297 | A1 | 9/2015 | |
| KR | 100968178 | B1 * | 7/2010 | |
| KR | 101953225 | B1 | 5/2019 | |

* cited by examiner

TRACK FITTING ASSEMBLY FOR SLIDING DOORS, AND TRACK SYSTEM

CROSS-REFERENCE TO RELATED APPLICATION

This application is a national stage application, filed under 35 U.S.C. § 371, of International Patent Application PCT/DE2022/000002, filed on Jan. 18, 2022, which claims the benefit of German Patent Application DE 20 2021 000 337.1, filed on Jan. 29, 2021.

BACKGROUND

DE 20 2020 101 165 U1 describes a rail system made of rolled sheet metal.

SUMMARY

The disclosure relates to a track fitting assembly comprising at least two mutually parallel tracks for a sliding door system. The track fitting assembly includes at least one Z-shaped carrier part, which has a fastening leg, a vertical leg and a support leg. The track fitting assembly also includes at least one insert part, at least some regions of which may be encompassed by the carrier part. Both the carrier part and the insert part each have a constant cross-section along their entire length oriented in the longitudinal direction. The disclosure further relates to a track system comprising at least one such track fitting assembly and at least one additional carrier part and/or at least one additional insert part. The disclosure finally relates to a piece of furniture comprising such a track system.

The present disclosure is based on the problem of developing a guide fitting for sliding doors that is stable even under changing operating loads.

This problem is solved by the guide fitting as described and claimed. For this purpose, the wall thickness of the vertical leg is thinner in the region adjacent to the fastening leg than in the region adjacent to the support leg.

The track system is designed in such a manner that the end faces of two carrier parts contact one another in a common abutment point and/or that the front faces of two insert parts contact one another in a common contact point. Each abutment point is offset in the longitudinal direction relative to a front face and each contact point is offset in the longitudinal direction relative to an end face.

Due to its geometric design, the carrier part of the track fitting assembly is designed to be inherently rigid. This eliminates the need for a vertical contact surface on the piece of furniture. The multi-part structure of the track fitting assembly also prevents deformation of the track fitting assembly under both static and dynamic operating loads.

When the track fitting assembly is extended to form a track system, the carrier parts and insert parts, which are offset from one another in the longitudinal direction, result in further stiffening of the track fitting assembly. Thus, the static and dynamic strength of the track fitting assembly is independent of its overall length. The high degree of rigidity also enables low-noise operation of the multi-part system.

DETAILED DESCRIPTION

Figure 1:
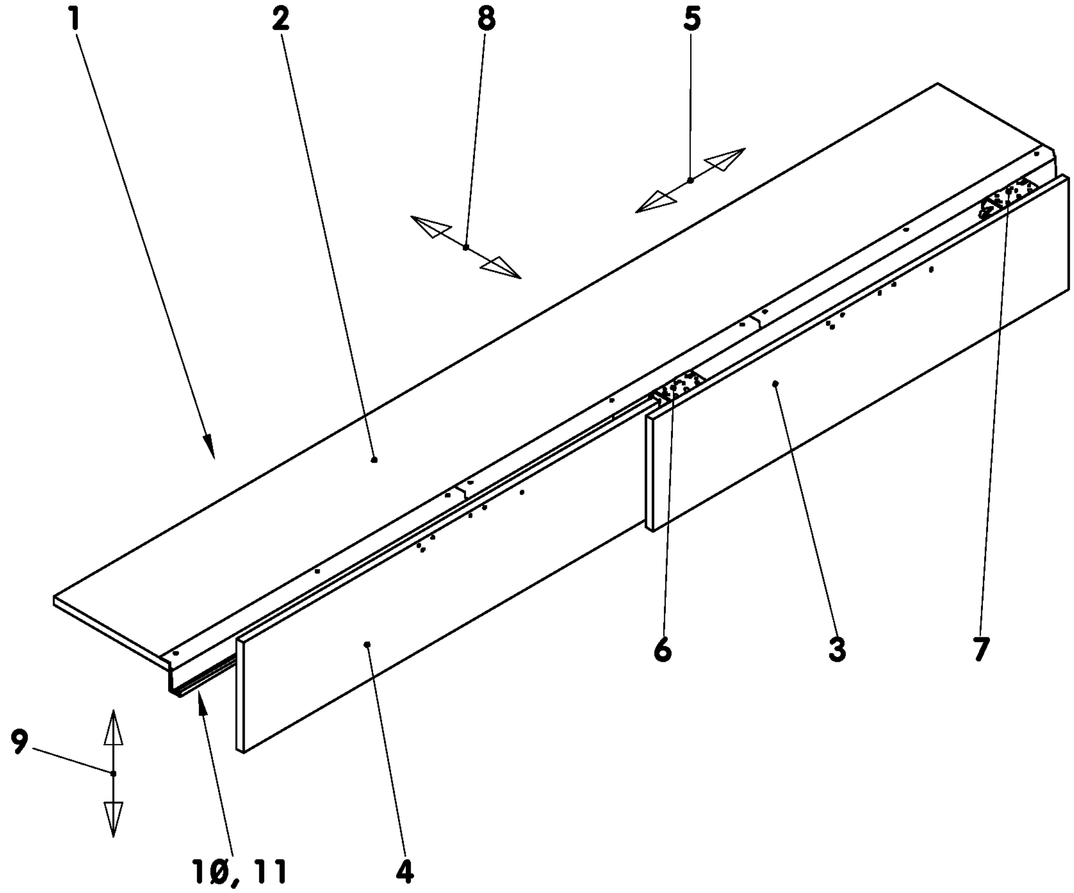
FIG. 1: piece of furniture with a sliding door system.

FIGS. 1-6 show a piece of furniture (1) with a sliding door system and individual parts thereof. The piece of furniture (1), for example a cabinet, has two sliding doors (3, 4) that may be moved parallel to one another in a longitudinal direction (5). Such sliding doors (3, 4) may be individually motor-driven or moved manually, for example. It is also conceivable to arrange more than two sliding doors (3, 4) on the body of the piece of furniture (1).

During movement, the sliding doors (3, 4) are guided along a track fitting assembly (10) arranged, for example, on the cover (2) of the piece of furniture (1). The illustrated track fitting assembly (10) has, for example, two tracks (71, 72) lying next to one another and parallel to one another for this purpose. In this exemplary embodiment, the two tracks (71, 72) have the same tangential plane normal to a vertical and the same length. However, it is also conceivable to arrange the two tracks (71, 72) at a different height level, for example. Moreover, the two tracks (71, 72) may have a different length oriented in the longitudinal direction (5). The length of the individual track (71; 72) is longer than the sliding door (3; 4) guided along such track (71; 72). For example, each of the sliding doors (3; 4) has two guide roller assemblies (6, 7) for guidance along the respective track (71; 72). Such guide roller assemblies (6, 7) are fastened in the upper region to the respective sliding door (3; 4).

The track fitting assembly (10) has at least one carrier part (21; 22, 23) and at least one insert part (41; 42), at least some regions of which is encompassed by the carrier part (21; 22; 23). The individual carrier parts (21; 22; 23) and/or the individual insert parts (41; 42) may have different individual lengths. The total length of the track fitting assembly (10) is at least equal to the sum of the individual lengths of the carrier parts (21; 22; 23) and at least equal to the sum of the individual lengths of the insert parts (41, 42). However, the total length of the track fitting assembly (10) may also be 25% longer than the smaller of such totals.

Figure 2:
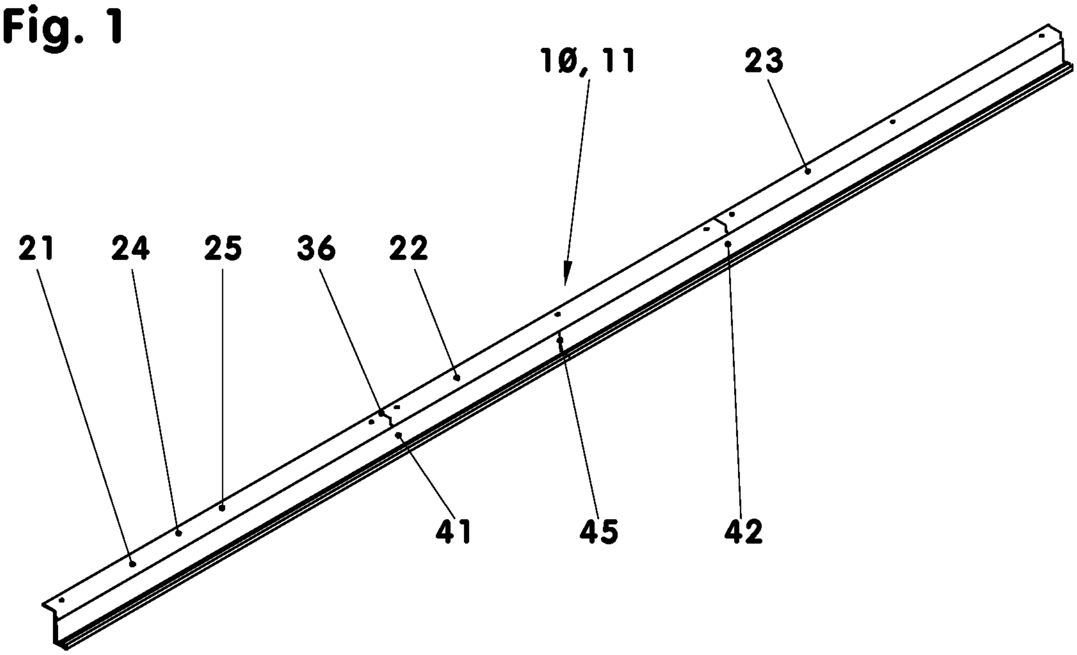
FIG. 2: track fitting assembly of the piece of furniture according to FIG. 1.

FIG. 2 shows the track fitting assembly (10) in the form of a track system (11). The track system (11) has at least two carrier parts (21, 22; 22, 23; 21, 23) and/or at least two insert parts (41, 42). In this exemplary embodiment, the track system (11) has three carrier parts (21, 22, 23) and two insert parts (41, 42) connected to them. In this exemplary embodiment, the sum of the lengths of all carrier parts (21, 22, 23) corresponds to the sum of the lengths of all insert parts (41, 42). However, the overall length of the track system (11) may also be within the above tolerance range. In the exemplary embodiment, the length of a carrier part (21; 22;

23) is two-thirds of the length of an insert part (41; 42). The total length of the track system (11) is, for example, two meters.

Figure 3:
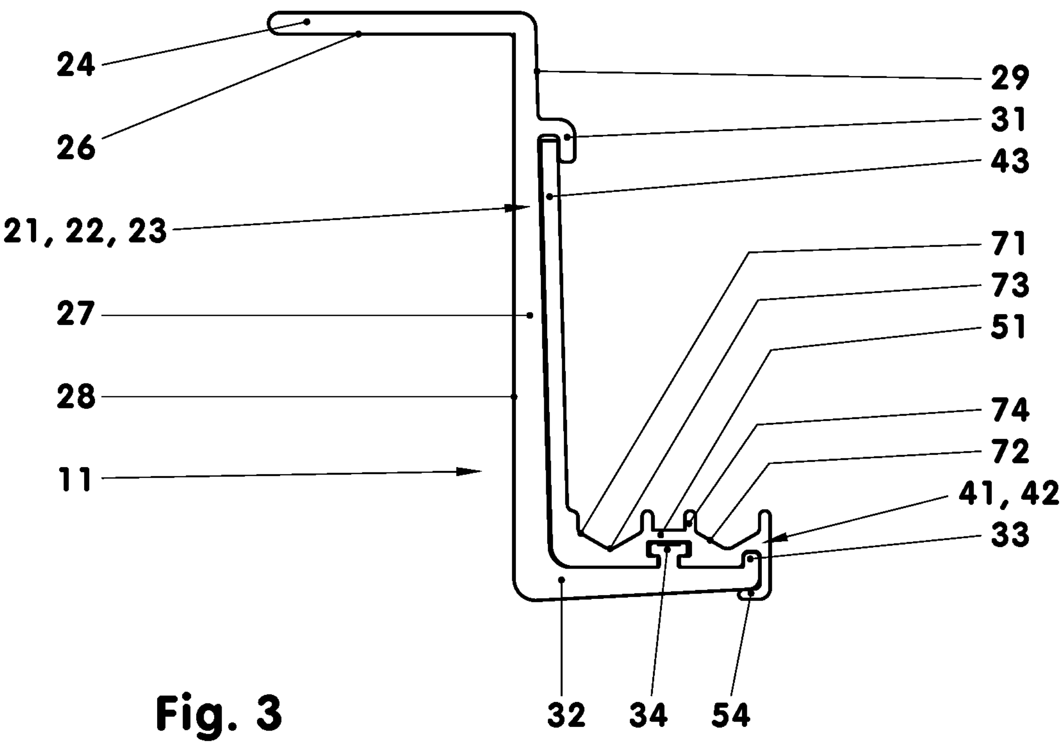
FIG. 3: front view of the track fitting assembly from FIG. 1.

FIG. 3 shows a front view of a track fitting assembly (10). The carrier part (21; 22; 23) is designed in a Z-shape. It has a fastening leg (24) with which it is fastened, for example, to the cover (2) of the piece of furniture (1). A vertical leg (27) is connected to the fastening leg (24). Such vertical leg (27) is located in front of the front side of the furniture body when the track fitting assembly (10) is mounted. A support leg (32) adjoins the lower end of the vertical leg (27). The support leg (32) projects out of the vertical leg (27) in the transverse direction (8) in the direction facing away from the furniture body.

The insert part (41; 42) is seated in the carrier part (21; 22; 23). The insert part (41; 42) is received in a positive-locking manner in the carrier part (21; 22; 23) except for an axial degree of freedom oriented in the longitudinal direction (5). In this exemplary embodiment, both tracks (71, 72) are designed in the insert part (41; 42). The two tracks (71; 72), for example, are designed identically to one another.

Figure 4:
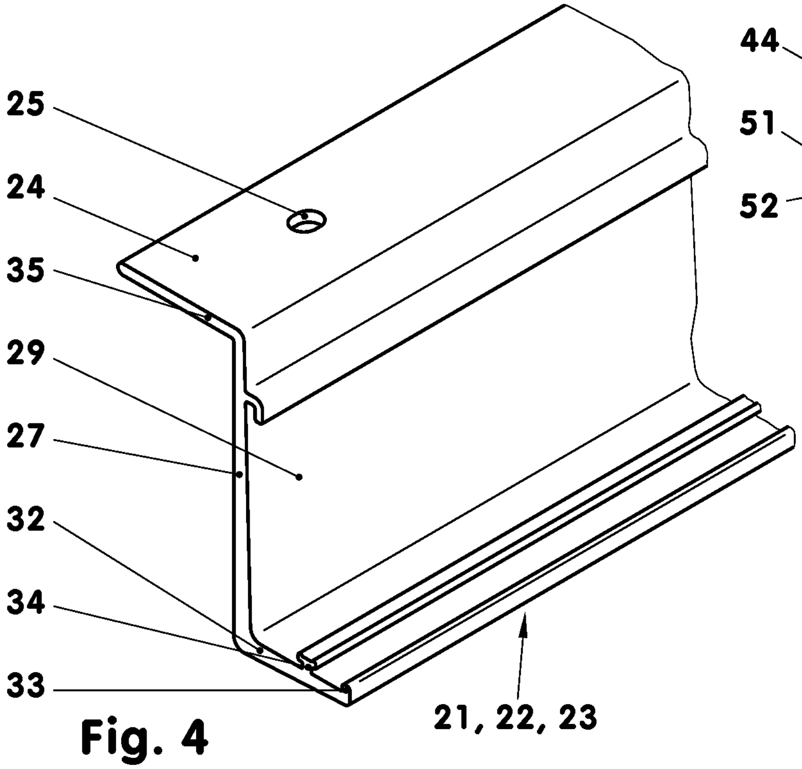
FIG. 4: carrier part of the track fitting assembly according to FIG. 2.

FIG. 4 shows an individual carrier part (21; 22; 23). The carrier part (21; 22; 23) has a constant cross-sectional profile and constant cross-sectional area along its length. Thereby, the cross-sectional plane is oriented normal to the longitudinal direction (5). The carrier part (21; 22; 23) may be made of metal, for example of aluminum, of plastic, of a composite material, etc. For example, it is produced by means of a primary forming method, for example an extrusion or extrusion drawing method, etc. The individual carrier part (21; 22; 23) is bounded in the longitudinal direction (5) by means of two end faces (35). The two, for example planar, end faces (35) of a carrier part (21; 22; 23) may be aligned parallel to one another. However, they may also include an angle of up to 5 degrees, with the apex line of such angle lying above the support legs (32).

The fastening leg (24) has an at least approximately cuboid shape. Its width oriented in the transverse direction (8) is, for example, 1% of the length of the track fitting assembly (10). Its thickness is, for example, 0.1% of the specified length. For example, the fastening leg (24) has three fastening bores (25). Such fastening bores (25) are through bores with cylindrical, frustoconical and/or chamfered cross-sections. In order to fasten the track fitting assembly (10) to the furniture body, for example, cap screws, hexagon head screws, countersunk screws, etc. are inserted in the fastening bores (25). However, the track fitting assembly (10) may also be fixed to the furniture body by means of gluing, positive-locking gripping, clamping, straightening, spring-loaded expansion, etc.

The vertical leg (27) is designed to be wedge-shaped in cross-section. Its thickness, which is the wall thickness of the vertical leg (27), increases from the fastening leg (24) to the support leg (32). In the exemplary embodiment, the thickness of the vertical leg (27) in the region adjacent to the fastening leg (24) corresponds to the thickness of the fastening leg (24). In the region adjacent to the support leg (32), the thickness of the vertical leg (27) is, for example, 1.75 times the thickness of the region adjacent to the fastening leg (24). In the exemplary embodiment, the increase in thickness from the fastening leg (24) to the support leg (32) is continuous and has a constant gradient. However, it is also conceivable to design the rise progressively, degressively or with jump points. With such a design of the vertical leg (27), the individual value of the thickness along a coordinate axis of an imaginary coordinate system oriented in the height direction (9) is, for example, greater than or equal to the thickness in the case of a linear increase. The transitions of the vertical leg (27) to the fastening leg (24) and to the support leg (32) are designed to be rounded. In the exemplary embodiment, the height of the vertical leg is approximately 3% of the length of the track fitting assembly (10).

The rear side (28) of the vertical leg (27) facing the furniture body lies in a normal plane to the plane of a bearing surface (26) of the fastening leg (24). The guide side (29) facing away from the furniture body has an encompassing bar (31). This is oriented in the direction of the support leg (32). The thickness of the encompassing bar (31) designed at an angle is, for example, three-quarters of the thickness of the fastening leg (32). The distance of the encompassing bar (31) from the plane of the bearing surface (26) is, for example, 0.4% of the length of the track fitting assembly (10).

The support leg (32) is oriented in the transverse direction (8). Its width oriented in the transverse direction (8) corresponds, for example, to the width of the fastening leg (24). At the transition to the vertical leg (27), the thickness of the support leg (32) is, for example, the thickness of the vertical leg (27). The thickness of the support leg (32) at its free end corresponds, for example, to the thickness of the fastening leg (24). At its free end, the support leg has an engagement bar (33). This projects upwards from the support leg (32). Between the vertical leg (27) and the engagement bar (33), the support leg (32) has a T-rail (34). This also projects upwards from the support leg (32). For example, the T-rail (34) is symmetrical about a vertical central longitudinal plane.

Figure 5:
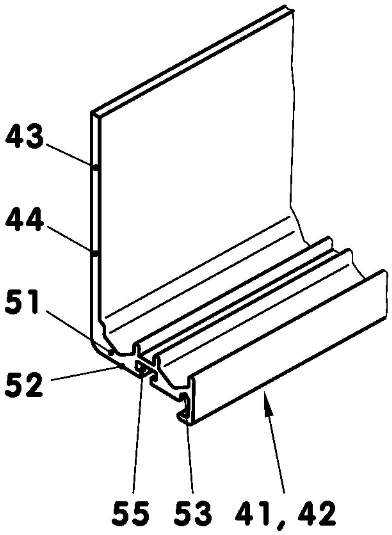
FIG. 5: insert part of the track fitting assembly according to FIG. 2.
Figure 6:
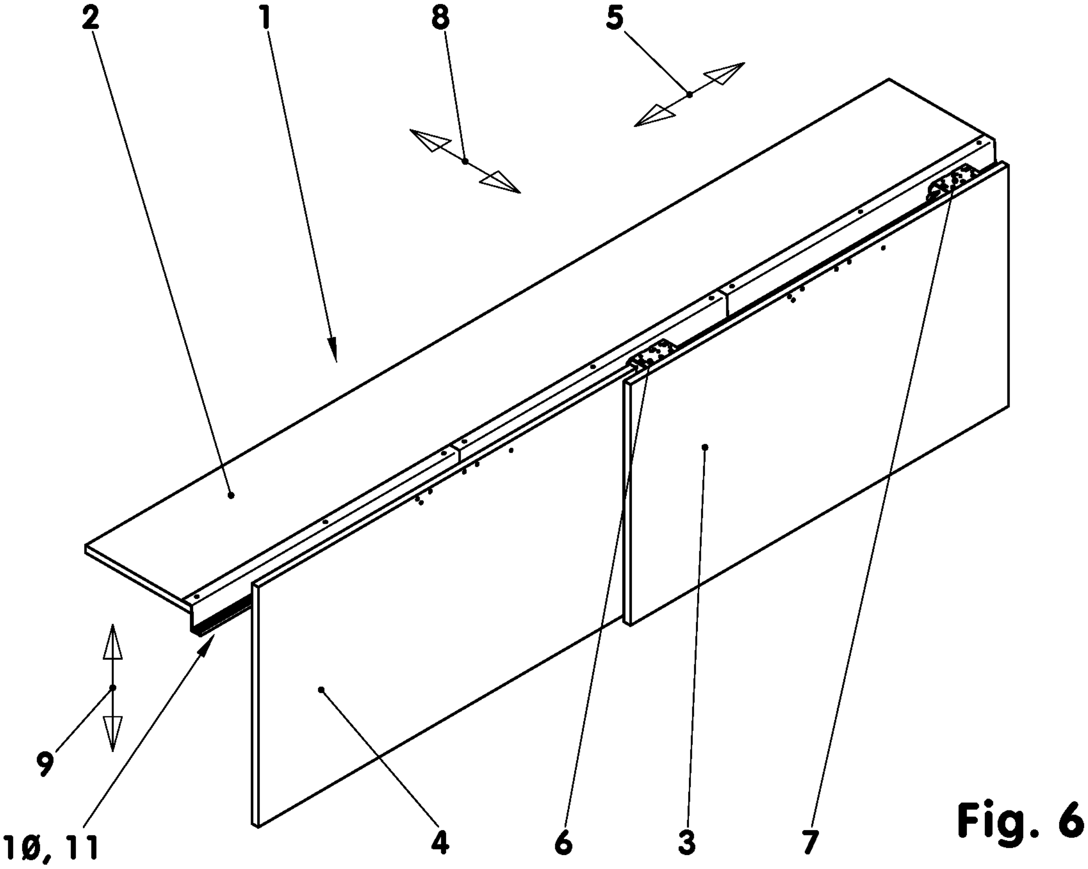
FIG. 6: variant of a piece of furniture with a sliding door system.

FIG. 5 shows an insert part (41; 42). The insert part (41; 42) may be made of the same material as the carrier part (21; 22; 23). However, it may also be made of one of the other materials specified in connection with the carrier part (21; 22; 23). The insert part (41; 42) is produced by means of one of the production methods specified in connection with the carrier part (21; 22; 23). The insert part (41; 42) also has the same cross-section over its entire length and a constant cross-sectional profile. The individual insert part (41; 42) is bounded in the longitudinal direction (5) by means of two front faces (44). Such front faces (44) may be designed and arranged relative to one another in the same manner as the end faces (35) of the individual carrier part (21; 22; 23).

In this exemplary embodiment, the insert part (41; 42) is designed with an L-shape in cross-section. It has a retaining leg (43) and a track leg (51). The retaining leg (43) and the track leg (51) are oriented at least approximately at right angles to one another. The retaining leg (43) is designed to be plate-shaped. In the illustration of FIG. 3, it is parallel to the guide side (29) of the carrier part (21; 22; 23). In this illustration, it engages under the encompassing bar (31) of the vertical leg (27) and rests on the support leg (32). In the exemplary embodiment, the thickness of the retaining leg (43) is 80% of the thickness of the fastening leg (24) of the carrier part (21; 22; 23).

In this exemplary embodiment, the track leg (51) has both an inner track (71) and an outer track (72). In a design of the track fitting assembly (10) having more than two tracks (71, 72), the insert part (41; 42) may have additional tracks (71; 72). The insert part (41; 42) has at least the outermost track (72). The width of the track leg (51) in the transverse direction (8) is, for example, 90% of the width of the support leg (32).

The distance between the two tracks (71, 72) is, for example, half the width of the track leg (51). In the exemplary embodiment, the individual track (71; 72) has a V-shaped, channel-shaped cross-section. For example, the opening angle is 120 degrees. The base (73) of the individual track (71; 72) is designed to be curved. However, it is also conceivable to design the tracks (71; 72) raised relative to the track leg (51). A different design of the individual tracks (71; 72) is also conceivable. The tracks (71; 72) are bounded laterally by means of limiting webs (74). The height of the individual limiting web (74) is, for example, 90% of the thickness of the fastening leg (24).

On its lower side (52), the track leg (51) has an engagement groove (53) in the outer region for receiving the engagement bar (33). The engagement groove (53) is bounded by means of a downwardly projecting overlap web (54), which encompasses the support leg (32) after assembly. Such encompassing may be subject to play. For example, approximately centrally on its lower side (52), the track leg (51) has a T-groove (55) oriented in the longitudinal direction (5) for receiving the T-rail (34). Such positive-locking connection centers and secures the position of the insert part (41; 42) relative to the carrier part (21; 22; 23) at least in the transverse direction (8) and in the height direction (9). Any moments that occur are also supported in all directions by means of this moment-resistant connection. Thus, the lower side (51) of the track leg (51) is complementary to the upper side of the support leg (32).

When assembling the track fitting assembly (10), an insert part (41; 42) is inserted into a carrier part (21; 22; 23). This is effected in the longitudinal direction (5). Thereby, the joining method is a merging by sliding into one another. Thereby, the carrier part (21; 22; 23) and the insert part (41; 42) engage in one another in such a manner that all degrees of freedom are blocked in a positive-locking manner, except for the axial mounting degree of freedom. If necessary, the carrier part (21; 22; 23) and the insert part (41; 42) may be fixed relative to one another in the axial direction after assembly.

A track fitting assembly (10) longer than the length of a carrier part (21; 22; 23) and/or an insert part (41; 42) may be designed as a track system (11). Thereby, at least one insert part (41; 42) has a different length than a carrier part (21; 22; 23). In the exemplary embodiment, the two components have the aforementioned length ratios to one another. Thereby, the individual insert part (41; 42) is longer than the individual carrier part (21; 22; 23).

When assembling such track system (11), an insert part (41; 42) and a carrier part (21; 22; 23) are first joined together, for example, in such a manner that a first front face (44) of a first insert part (41; 42) is flush with a first end face (35) of a first carrier part (21; 22; 23). Subsequently, an additional carrier part (22; 23; 21) is connected to the insert part (41; 42). After joining an additional insert part (42; 41) and a third carrier part (23; 21; 22), the track fitting assembly (10) shown in FIGS. 1 and 2 is assembled in the form of a track system (11). In such track system (11), two carrier parts (21, 22; 22, 23) contact one another in a common abutment point (36). Thereby, the two carrier parts (21, 22; 22, 23) rest against one another with their end faces (35). Depending on the design of the end faces (35), such contact may be a point contact, a line contact or a surface contact. Furthermore, two insert parts (41, 42) rest against one another with their front faces (44). The contact of such two front faces (44) forms a contact point (45) of the insert parts (41, 42). The contact point (45) may also be designed as a point, line or surface. After assembly, such contact points (45) of the insert parts (41, 42) are offset in the longitudinal direction (5) from the abutment points (36) of the carrier parts (21, 22; 22, 23). In the exemplary embodiment, such offset in the longitudinal direction (5) is half the length of a carrier part (21; 22; 23). The size of the axial offset is, for example, between 10% and 90% of the length of the shortest of the carrier parts (21; 22; 23) and insert parts (41; 42). With such an arrangement, each abutment point (36) of the carrier parts (21, 22; 22, 23) is offset in the longitudinal direction (5) from each front face (44) of one of the insert parts (41; 42). At the same time, each contact point (45) of two insert parts (41, 42) is offset in the longitudinal direction (5) from each end face (35) of a carrier part (21; 22; 23).

After assembling the track fitting assembly (10), it may be mounted to the piece of furniture (1). Thereby, the fastening leg (24) is placed, for example, on the cover (2) of the piece of furniture (1) and fastened as described above. After such mounting, the vertical leg (27) hangs downwards, wherein, for example, the upper part of the furniture body is covered. Due to the inherent rigidity of the track fitting assembly (10), a contact of the vertical leg (27) to the front face of the cover (2) is not necessary. As such, the front side of the cover (2) may be unmachined.

The sliding doors (3, 4) are hooked into the track fitting assembly (10) in such a manner that the guide roller assemblies (6, 7) of a sliding door (3; 4) are seated together with their rollers in a track (71; 72). For example, the individual sliding door (3; 4) may be supported in the lower region on the furniture body. A sliding or roller guide of the lower region of the sliding door (3; 4) on the furniture body is also conceivable. In the case of a sliding guide, this may be designed on one side, for example as a contact guide on the base part of the furniture body. Such a contact guide may be arranged, for example, as a strip oriented in the longitudinal direction (5) with a vertical extension on the base part.

After the sliding doors (3; 4) have been hooked in, the weight force of the sliding doors (3; 4) loads the track fitting assembly (10). The design of the cross-section of the track fitting assembly (10) prevents the bending of the track fitting assembly (10) both in a plane normal to the longitudinal direction (5) and in a vertical plane containing the longitudinal direction (5).

In order to open and close the piece of furniture (1), the sliding doors (3; 4) are moved relative to the furniture body. Thereby, the track rollers of the individual sliding doors (3; 4) are rolled and/or rotated over the contact points (45). Thereby, at any one time, a maximum of one track roller rolls over a contact point (45). Due to the tight bond between the carrier parts (21, 22, 23) and the insert parts (41, 42), the contact points (45) are free of gaps even when loaded. Only low running noise is generated. The encompassing of the insert part (41; 42) around the carrier part (21; 22; 23) by means of the overlap web (54) also prevents injuries to the installer or the operator.

FIGS. 6-10 show a variant of the track fitting assembly (10) in the form of a track system (11). Like the first exemplary embodiment, the track system (11) shown has three carrier parts (21, 22, 23) and two insert parts (41, 42). Such track system (11) may also have a different number of carrier parts (21, 22, 23) and/or insert parts (41, 42). This allows the track system (11) to be adapted to different installation lengths.

Figure 7:
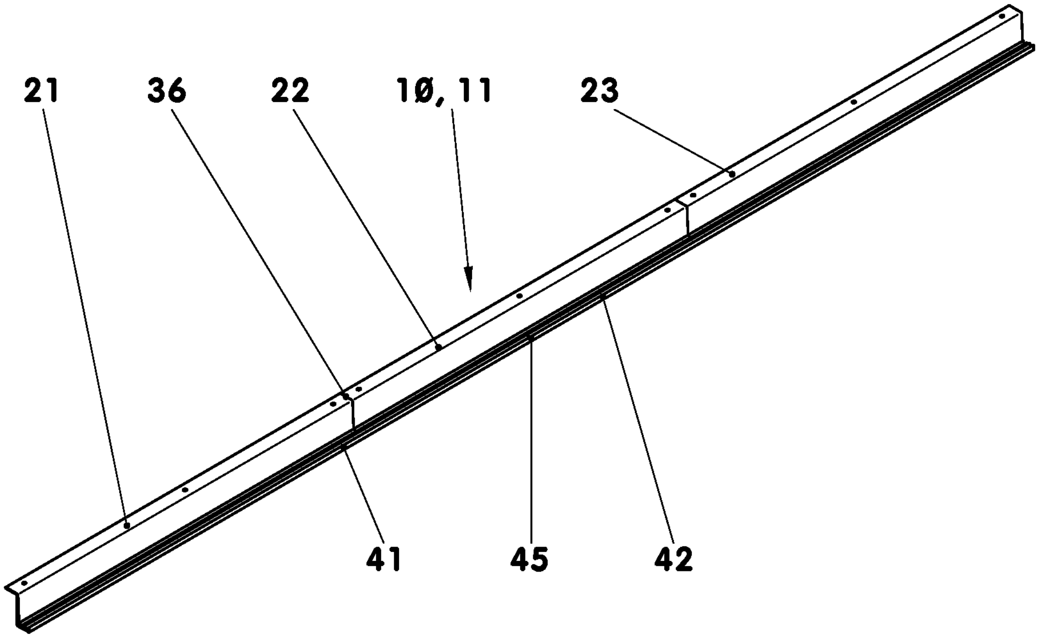
FIG. 7: track fitting assembly of the piece of furniture according to FIG. 6.
Figure 8:
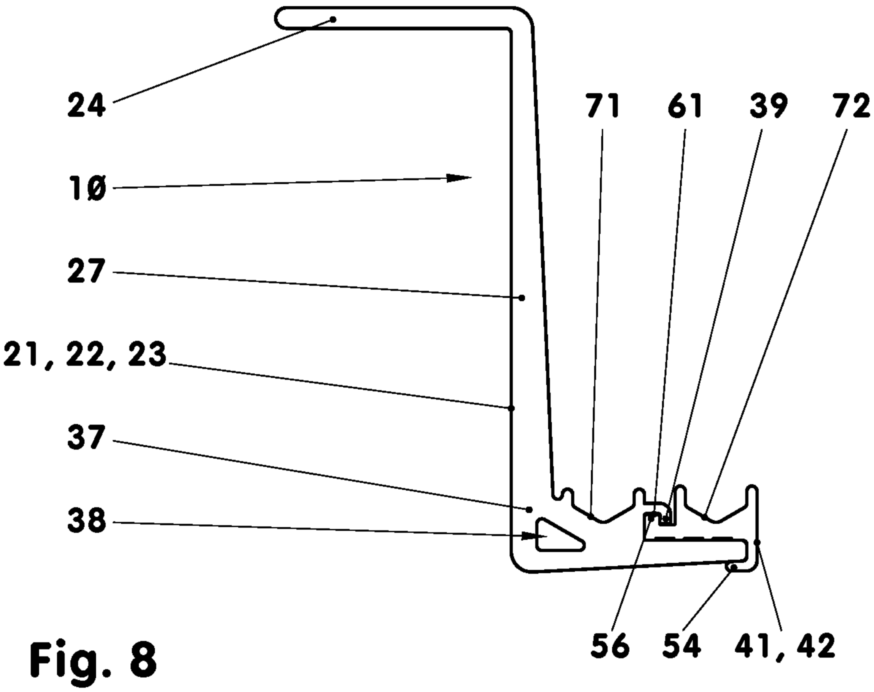
FIG. 8: front view of the track fitting assembly from FIG. 6.
Figure 9:
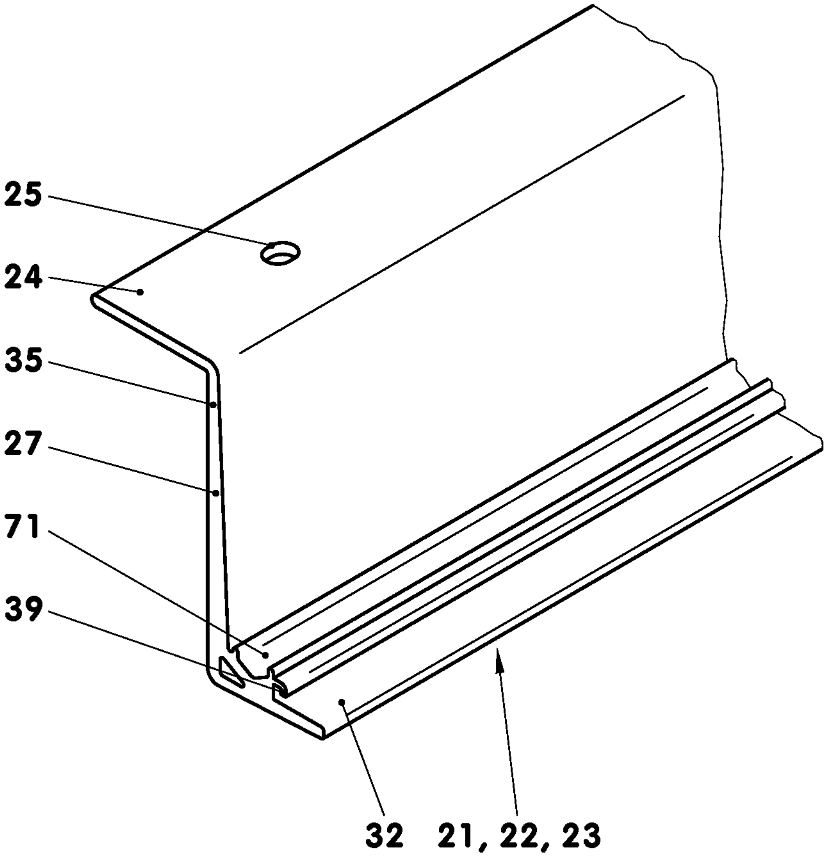
FIG. 9: carrier part of the track fitting assembly according to FIG. 6.

The individual carrier part (21; 22; 23), see FIGS. 7-9, is also designed in a Z-shape in this exemplary embodiment. It may be made of the same materials as the carrier part (21; 22; 23) shown in FIGS. 1-4. Moreover, such carrier parts (21, 22, 23) may be produced using the same primary forming methods.

The fastening leg (24) corresponds in its geometric dimensions and structure to the fastening leg (24) of the first exemplary embodiment. The fastening leg (24) merges into the vertical leg (27) in an arc of constant thickness. The height of the vertical leg (27) in this exemplary embodiment is also, for example, 8% of the length of the individual carrier part (21; 22; 23). For example, the thickness of the vertical leg (27) at the transition to the fastening leg (24) corresponds to the thickness of the fastening leg (24). From here, the wall thickness of the vertical leg (27) in the exemplary embodiment increases, for example, to double in the region of the transition to the support leg (32). The increase in thickness is linear, for example. In this exemplary embodiment, the vertical leg (27) is designed without an encompassing bar (31).

The transition from the vertical leg (27) to the support leg (32) is designed with a large radius. In the transition region (37), a longitudinal aperture (38) is designed in the exemplary embodiment.

For example, the support leg (32) has the same width as the fastening leg (24). It has an internal track (71). Such track (71) is designed, for example, as the inner track (71) of the first exemplary embodiment of the track fitting assembly (10). With a design of the track fitting assembly (10) having more than two tracks (71, 72), another track (72; 71) adjacent to the inner track (71) may also be part of the carrier part (21; 22; 23). An encompassing hook bar (39) is designed next to the internal track (71) of the carrier part (21; 22; 23). This encompasses an engagement space (61). The support leg (32) is tapered towards its outer end.

Figure 10:
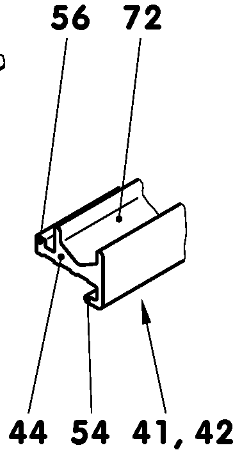
FIG. 10: insert part of the track fitting assembly according to FIG. 6.

In this exemplary embodiment, the insert part (41; 42), see FIGS. 8 and 10, has only the track leg (51). On its inner side facing the vertical leg (27), the insert part (41; 42) has a rear grip bar (56). In the mounted state, this engages in the engagement space (61) behind the encompassing hook bar (39) and thus secures the position of the insert part (41; 42) relative to the carrier part (21; 22; 23). On its upper side, the insert part (41; 42) has a track (72). In the illustrations of FIGS. 7 and 8, this is an outer track (72). Such track (72) is designed, for example, like the inner track (71) of the track fitting assembly (10). It is also conceivable to design the insert part (41; 42) with additional tracks (71, 72) adjacent to the outer track (72) and parallel thereto.

At its outer end, the insert part (41; 42) has a downwardly projecting overlap web (54). When the track fitting assembly (10) is assembled, this encompasses the support leg (32) of the carrier part (21; 22; 23). It also closes the track fitting assembly (10) to the outside.

The assembly of the track fitting assembly (10) and the track system (11) are carried out as described above. The mounting and operation of the track fitting assembly (10) of this exemplary embodiment also corresponds to the first exemplary embodiment.

Combinations of the individual exemplary embodiments are also conceivable.

LIST OF REFERENCE SIGNS

1 Piece of furniture
2 Cover
3 Sliding door
4 Sliding door
5 Longitudinal direction
6 Guide roller assembly
7 Guide roller assembly
8 Transverse direction
9 Height direction
10 Track fitting assembly
11 Track assembly
21 Carrier part
22 Carrier part
23 Carrier part
24 Fastening leg
25 Fastening bores
26 Contact surface of (24)
27 Vertical leg
28 Rear side of (27)
29 Guide side
31 Encompassing bar
32 Support leg
33 Engagement bar
34 T-rail
35 End face
36 Abutment point
37 Transition region
38 Longitudinal aperture
39 Encompassing hook bar
41 Insert part
42 Insert part
43 Retaining leg
44 Front face
45 Contact point
51 Track leg
52 Lower side of (51)
53 Engagement groove
54 Overlap web
55 T-groove
56 Rear grip bar
61 Engagement space
71 Track, inner track
72 Track, outer track
73 Base of (71, 72)
74 Limiting web

The invention claimed is:

1. A track fitting assembly (10), comprising:
at least two mutually parallel tracks (71, 72) for a sliding door system;
at least one Z-shaped carrier part (21; 22; 23) which has a vertical leg (27),
a fastening leg (24) extending horizontally from a top of the vertical leg (27), and
a support leg (32) extending horizontally from a bottom of the vertical leg (27) opposite the fastening les (24), the support leg (32) being configured to support the at least two mutually parallel tracks (71, 72) arranged thereon; and
at least one insert part (41; 42), at least some regions of which can be encompassed by the carrier part (21; 22; 23),
wherein both the carrier part (21; 22; 23) and the insert part (41; 42) each have a constant cross-section along their entire lengths in a longitudinal direction (5), and
wherein a wall thickness of the vertical leg (27) is thinner in a region adjacent to the fastening leg (24) than in a region adjacent to the support leg (32).

2. The track fitting assembly (10) according to claim 1, wherein the wall thickness of the vertical leg (27) increases steadily from the fastening leg (24) to the support leg (32).

3. The track fitting assembly (10) according to claim 1, wherein a maximum wall thickness of the carrier part (21; 22; 23) is greater than one and a half times a minimum wall thickness of the carrier part (21; 22; 23).

4. The track fitting assembly (10) according to claim 1, wherein a total length of the track fitting assembly (10) is at least a sum of individual lengths of all carrier parts (21; 22; 23), and at most 1.25 times the sum of the individual lengths of all carrier parts (21; 22; 23), and at least a sum of individual lengths of all insert parts (41; 42), and at most 1.25 times the sum of the individual lengths of all insert parts (41; 42).

5. The track fitting assembly (10) according to claim 1, wherein the carrier part (21; 22; 23) comprises at least one T-rail (34) or at least one encompassing hook bar (39) for securing a position of the insert part (41; 42) relative to the carrier part (21; 22; 23) in regions.

6. The track fitting assembly (10) according to claim 1, wherein the least two mutually parallel tracks (71, 72) include one or more inner tracks (71) proximal to the vertical lee (27), and an outer track (72) distal from the vertical leg (27), and wherein the one or more inner tracks (71) are formed on the carrier part (21; 22; 23), and wherein the outer track (72) is not formed on the carrier part (21; 22; 23).

7. The track fitting assembly (10) according to claim 1, wherein the insert part (41; 42) has at least one track (72).

8. The track fitting assembly (10) according to claim 7, wherein an outer track (72) of the least two mutually parallel tracks (71, 72) is arranged further from the vertical leg (27) than any other of the at least two mutually parallel tracks (71, 72), and wherein the outer track (72) is formed on the insert part (41; 42).

9. The track fitting assembly (10) according to claim 1, wherein the insert part (41; 42) has at least one T-groove (55) or at least one rear grip bar (56) for engaging behind the carrier part (21; 22; 23) in regions.

10. The track fitting assembly (10) according to claim 1, wherein the carrier part (21; 22; 23) and the insert part (41, 42) engage in one another in a positive-locking manner and block at least five degrees of freedom.

11. A track system (11) comprising at least one track fitting assembly (10) according to claim 1 and at least one additional carrier part (21; 22; 23) and/or at least one additional insert part (41; 42), wherein end faces (35) of two carrier parts (21, 22; 22, 23) contact one another at a common abutment point (36) and/or wherein front faces (44) of two insert parts (41, 42) contact one another at a common contact point (45), wherein each abutment point (36) is offset in the longitudinal direction (5) relative to a front face (44), and wherein each contact point (45) is offset in the longitudinal direction (5) relative to an end face (35).

12. The track system (11) according to claim 11, wherein a sum of lengths of all carrier parts (21, 22, 23) corresponds to a sum of lengths of all insert parts (41, 42).

13. The track system (11) according to claim 11, wherein at least one carrier part (21; 22; 23) and at least one insert part (41; 42) have different lengths.

14. A piece of furniture (1) with a track system (11) according to claim 11.

* * * * *